(12) United States Patent
Sanchez

(10) Patent No.: US 12,008,148 B2
(45) Date of Patent: Jun. 11, 2024

(54) SAFETY DEVICE CONFIGURATION CLONING

(71) Applicant: OMRON Corporation, Kyoto (JP)

(72) Inventor: Alejandro Ruiz Sanchez, Newark, CA (US)

(73) Assignee: OMRON Corporation, Kyoto (JP)

( * ) Notice: Subject to any disclaimer, the term of this patent is extended or adjusted under 35 U.S.C. 154(b) by 311 days.

(21) Appl. No.: 17/593,216

(22) PCT Filed: Feb. 27, 2020

(86) PCT No.: PCT/US2020/020220
§ 371 (c)(1),
(2) Date: Sep. 13, 2021

(87) PCT Pub. No.: WO2020/190473
PCT Pub. Date: Sep. 24, 2020

(65) Prior Publication Data
US 2022/0180002 A1 Jun. 9, 2022

Related U.S. Application Data

(60) Provisional application No. 62/819,406, filed on Mar. 15, 2019.

(51) Int. Cl.
*H04L 29/06* (2006.01)
*G06F 21/44* (2013.01)
*G06F 21/73* (2013.01)

(52) U.S. Cl.
CPC .............. *G06F 21/73* (2013.01); *G06F 21/44* (2013.01)

(58) Field of Classification Search
CPC ....................................................... G06F 21/44
See application file for complete search history.

(56) References Cited

U.S. PATENT DOCUMENTS 6,257,486 B1 7/2001 Teicher et al.
2003/0218533 A1 11/2003 Flick
(Continued)

FOREIGN PATENT DOCUMENTS

EP 1499067 1/2005
EP 1553746 7/2005
(Continued)

OTHER PUBLICATIONS

Extended European Search Report for Application No. 20773547.3 dated Sep. 29, 2022 in 11 pages.
(Continued)

*Primary Examiner* — Jason K Gee
(74) *Attorney, Agent, or Firm* — Knobbe Martens Olson & Bear LLP

(57) ABSTRACT

This application describes a method operable by a safety unit that comprises a safety sensor, the sensor configured to perform a safety feature based on one or more sensor parameters. The method may involve accessing a memory card, the card having stored thereon a password, a parameter set, and a flag indicative of whether the parameter set is unique to the sensor. The method may involve determining, based on the flag, that the parameter set is not unique to the sensor. The method may involve determining whether the password stored on the card matches a sensor password of the sensor. The method may involve, in response to the password stored on the card matching the sensor password, writing a sensor serial number of the sensor onto the card.

28 Claims, 6 Drawing Sheets

(56) References Cited

U.S. PATENT DOCUMENTS

| | | |
|---|---|---|
| 2005/0198233 A1 | 9/2005 | Manchester et al. |
| 2005/0272371 A1 | 12/2005 | Komatsuzaki et al. |
| 2007/0182538 A1 | 8/2007 | Ota et al. |
| 2008/0281953 A1 | 11/2008 | Blaisdell |
| 2010/0214607 A1 | 8/2010 | Hepworth et al. |
| 2010/0217427 A1 | 8/2010 | Gray et al. |
| 2010/0217428 A1 | 8/2010 | Strong et al. |
| 2010/0217719 A1 | 8/2010 | Olsen et al. |
| 2011/0196946 A1* | 8/2011 | Manchester .............. H04L 9/40 709/220 |
| 2012/0123563 A1 | 5/2012 | Drinkard |
| 2016/0105644 A1* | 4/2016 | Smith .............. G08B 13/19667 348/159 |
| 2016/0232360 A1* | 8/2016 | Lu ...................... G06F 13/4282 |
| 2018/0048870 A1 | 2/2018 | Drinkard |
| 2022/0004614 A1* | 1/2022 | Daniel .................... G06F 21/35 |

FOREIGN PATENT DOCUMENTS

| | | |
|---|---|---|
| JP | 2005-267163 | 9/2005 |
| JP | 2012-518848 | 8/2012 |
| JP | 2013-218443 | 10/2013 |
| JP | 2014-504394 | 2/2014 |

OTHER PUBLICATIONS

Search Report and Written Opinion received in International Application No. PCT/US2020/20220 dated Jun. 23, 2020.

* cited by examiner

SAFETY DEVICE CONFIGURATION CLONING

CROSS-REFERENCE TO RELATED APPLICATION(S)

This application claims the benefit of U.S. Provisional Application No. 62/819,406, filed Mar. 15, 2019, which is hereby incorporated by reference in its entirety.

BACKGROUND

Field

This application relates to automated systems, and in particular, to configuring sensors of automated or robotic devices, as well as related systems and methods.

Description

An automated system may include mobile and/or stationary robots used to perform various tasks for industrial automation. Mobile robots include, for example, automated guide vehicles, automated intelligent vehicles, etc. which assist with routine, labor intensive material handling tasks. Stationary robots include, for example, robotic arms which typically comprise a plurality of links connected by one or more joints. The one or more joints of a robotic arm are driven by various types of actuators (e.g., electric motors, hydraulics, etc.) to control articulation of the robotic arm to position an end effector that is configured to perform a task.

Automated systems may utilize one or more safety sensors or devices that detect, measure, analyze, and process various changes that occur on productions sites, such as changes in position, length, height, displacement, and appearance. Configuring a safety sensor having a large and complex set of configurable parameters may pose challenges in some instances. Additionally, an automated system may comprise a large number of safety sensors needing to programmed identically.

SUMMARY

This application describes a first system configured to facilitate safety sensor configuration. The system may comprise an automated device comprising a safety sensor configured to perform a safety feature based on one or more sensor parameters, wherein a sensor serial number and a sensor password are linked with the sensor. The system may comprise a removable memory card configured to be accessed by the automated device and having stored thereon a password, a parameter set, and a flag indicative of whether the parameter set is unique to the automated device. The system may comprise a processor coupled to the sensor, and a memory storing computer-executable instructions to cause the processor to: determine, based on the flag, that the parameter set is not unique to the device; determine whether the password stored on the card matches the sensor password; and in response to the password stored on the card matching the sensor password, configure the sensor to perform the safety feature based on the parameter set from the card. In related aspects, there is provided a method operable by a safety sensor, the sensor configured to perform a safety feature based on one or more sensor parameters.

In another aspect, this application describes a second system configured to facilitate safety sensor configuration. The system may comprise a device comprising a safety sensor configured to perform a safety feature based on one or more sensor parameters, wherein a sensor serial number is linked with the sensor. The system may comprise a removable memory card configured to be accessed by the device and having stored thereon a parameter set and a flag indicative of whether the parameter set is unique to the device. The system may comprise a processor coupled to the sensor, and a memory storing computer-executable instructions to cause the at least one processor to: determine, based on the flag, that the parameter set is unique to the device; determine whether information in the flag corresponds to the sensor serial number; and in response to the information in the flag corresponding to the sensor serial number, configure the sensor to perform the safety feature based on the parameter set.

The examples and features described in this section are intended only as a summary of the invention and should not be construed as limiting. Additional examples and features are described in more detail below.

BRIEF DESCRIPTION OF THE DRAWINGS

These drawings depict only several embodiments in accordance with the disclosure and are not to be considered limiting of its scope. In the drawings, similar reference numbers or symbols typically identify similar components, unless context dictates otherwise. The drawings may not be drawn to scale.

DETAILED DESCRIPTION

Techniques for configuring parameters of sensors of automated or robotic systems, as well as related systems and methods, will now be described in detail with reference to certain embodiments illustrated in the figures. The illustrated embodiments described herein are provided by way of illustration and are not meant to be limiting. Other embodiments can be utilized, and other changes can be made, without departing from the spirit or scope of the subject matter presented. It will be readily understood that the aspects and features of the present disclosure described below and illustrated in the figures can be arranged, substituted, combined, and designed in a wide variety of different configurations by a person of ordinary skill in the art, all of which are made part of this disclosure.

An automated system may include one or more mobile robots and/or one or more stationary robots for handling various tasks. For example, to help move materials between locations in a factory or warehouse efficiently, fleets of mobile robots, also called automated guided vehicles (AGVs), may be utilized at order processing centers, manufacturing facilities, hospitals, etc.

Stationary robots may include robotic arms configured for specific tasks (e.g., assembly operations, diecasting, fettling machines, gas welding, arc welding, and pick and place work). Examples of stationary robots include but are not limited to: (i) Cartesian robots whose axes form a cylindrical coordinate system; (ii) cylindrical robots whose axes form a cylindrical coordinate system; (iii) polar robots whose axes form a polar coordinate system; (iv) selective compliance assembly robot arm (SCARA) robots featuring two parallel rotary joints to provide compliance in a plane; (v) articulated robots whose arm has at least three rotary joints; (vi) parallel robots whose arms have concurrent prismatic or rotary joints; and (vii) anthropomorphic robots shaped in a way that resembles a human hand, i.e., having independent fingers and thumbs.

Safety sensors/components may be used with mobile and/or stationary robots (referred to collectively herein as "robots") for safety countermeasures in equipment and facilities. Safety sensors may be used for shut-out detection of mechanical guards, checking intrusion into hazardous areas, and building safety circuits. Examples of safety sensors included but are not limited to: safety laser scanners; safety light curtains, single-beam safety sensors, limit switches, stop switches, a safety relays, and safety network controller.

Figure 1:
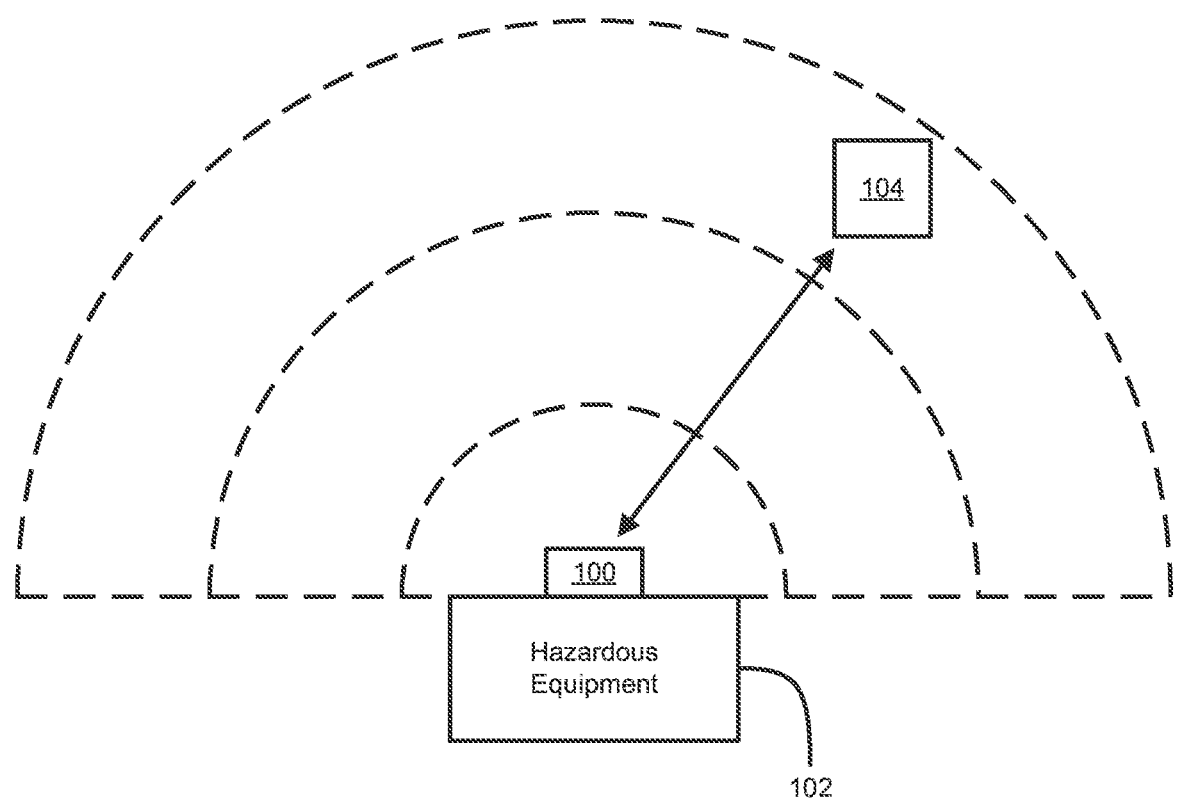
FIG. 1 shows an example embodiment of a laser scanner configured for guarding hazardous equipment.

Safety laser scanners or other systems for sensing the presence of an object and/or for measuring a distance to an object can be used in various applications, such as for guarding hazardous equipment (e.g., industrial machinery), for surveying, for security systems, for robot vision, robot guidance or pathfinding, etc. FIG. 1 shows a laser scanner 100 configured for guarding hazardous equipment 102 (e.g., such as industrial machinery). Although various examples are provided herein with relation to laser scanners for machine guarding, the features and concepts disclosed herein can be applied to various other contexts such as range finders, surveying equipment, light curtains, motion detectors, navigation systems, autonomous vehicles, etc.

As shown in FIG. 1, a laser scanner 100 can emit a pulse of light and receive light reflected from an object 104, which can be measured and used to determine that the object 104 is present. In some applications, the laser scanner 100 can send pulses of light in multiple directions so that the direction to the object can be determined. For example, the laser scanner 100 can step light pulses across an angular field of view, such as at sub-degree increments, although other increments or other configurations could be used, depending on the application. The laser scanner 100 can determine a distance to the object 104, such as by determining a time-of-flight for the light to travel to the object and then back to the laser scanner 100. For example, the distance to the object can be ½·c·t, where c is the speed of light, and t is the time-of-flight. Using the direction and distance information, the location of the object 104 can be determined. Action can be taken in response to the determination of the location, direction, and/or distance of the object. For example, the hazardous equipment 102 can be stopped if an object 104 (e.g., a person) comes within a threshold distance, or an alarm or warning can be issued, etc.

Figure 2:
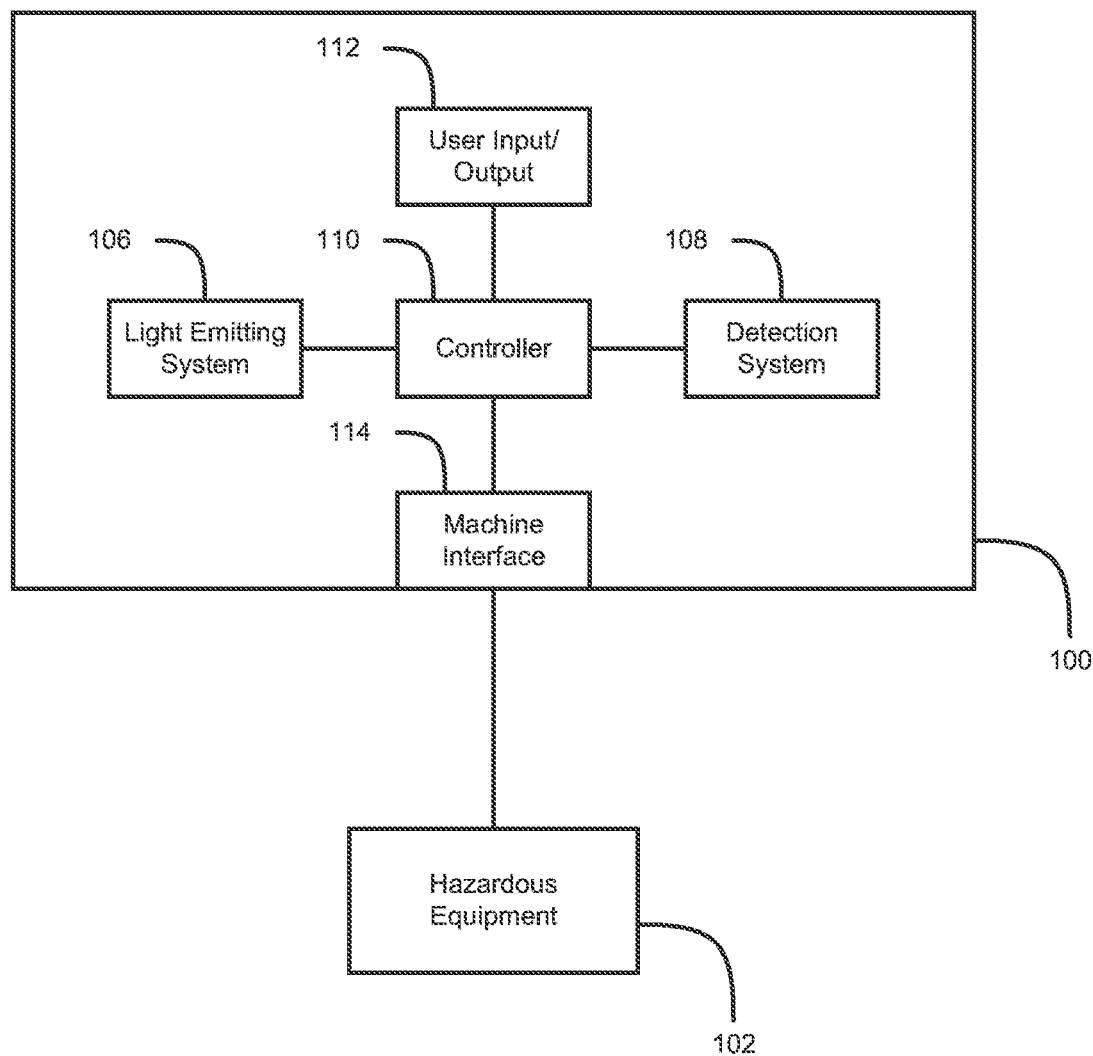
FIG. 2 is a block diagram showing components of an example embodiment of laser scanner.

FIG. 2 is a block diagram showing components of an example embodiment of laser scanner 100. The laser scanner 100 can have a light emitting system 106, which can be configured to emit light, such as by producing pulses of light. The light emitting system 106 can have a laser, such as a pulse laser that is configured to output discrete laser pulses. The duration of the light pulses (e.g., the laser pulse width) can also affect the resolution of the distance determination. For example, in some cases, increasing the actual sampling rate can have diminishing returns for increasing the distance resolution if the light pulses are not fast enough. Faster lasers, e.g., that produce laser pulses with shorter pulse widths, can be expensive. Some embodiments disclosed herein can relate to upsampling to effectively increase the sampling rate to increase the resolution of the distance measurement while using cost effective lasers and other components.

The laser scanner 100 can have a detection system 108 that can be configured to receive light of the laser pulses that is reflected from the object 104 back to the laser scanner 100. The laser scanner 100 can have a controller 110 configured to control operations of the laser scanner 100, as described herein. The controller 110 can include one or more hardware processors, and can execute instructions that are stored in computer-readable memory (e.g., in a non-transitory computer readable medium). The laser scanner 100 can have a machine interface 114, which can output instructions to corresponding hazardous equipment 102 (e.g., industrial machinery). For example, the laser scanner can stop the machinery or move the machinery to a safety configuration if an object (e.g., a person) is detected at a specified location or distance, etc. Other output signals can also be provided, such as for warning or alarms or data logging, etc.

The laser scanner 100 can have input/output features 112. For example, user input elements (e.g., one or more buttons, dials, switches, microphone, etc.) can be used to receive input from a user. User output elements (e.g., one or more lights, speakers, display, printer, etc.) can be used to output information to a user. In some cases, user input and output elements can be combined, such as a touchscreen display. The input and output elements 112 can be used to configure, operate, and/or troubleshoot the laser scanner 100. The output elements 112 can provide direction, distance, and/or location information regarding an object. By way of example, the laser scanner 100 can have multiple lights that can be selectively illuminated to indicate a direction of an object. Different colors or numerical values can be output to indicate a distance of a detected object from the scanner 100. The laser scanner 100 can output a first color of light (e.g., green) for a safe condition (e.g., in which no object is determined to be in a dangerous location or range) and can output a second color of light (e.g., red) for a danger condition (e.g., in which an object is determined to be in a dangerous location or range). The above-described features, as well as other features, of the laser scanner 100, may be configured for particular task(s) by setting or programming one or more parameters of the laser scanner 100.

In accordance with one or more aspects of the present disclosure, a safety sensor (e.g., the laser scanner 100) may have a large and complex set of configurable parameters that need to be programmed. Further, a large number of safety sensors that have the same large and complex set of configurable parameters may need to be programmed identically, for example, when commissioning a fleet of AGVs. The systems and methods described herein provide users with a fast and efficient way to program one or more safety sensors, as well as sensors generally, that does not involve individually connecting, configuring, and confirming each of the one or more parameters in each single sensor.

In one embodiment, safety sensor(s) and/or automated device(s) that comprise one or more safety sensors may be configured/programmed to perform a safety feature/task by utilizing portable memory device(s), e.g., removable memory card(s), while still preventing the unauthorized reconfiguration of safety sensor(s) already configured to perform the safety feature.

Figure 3:
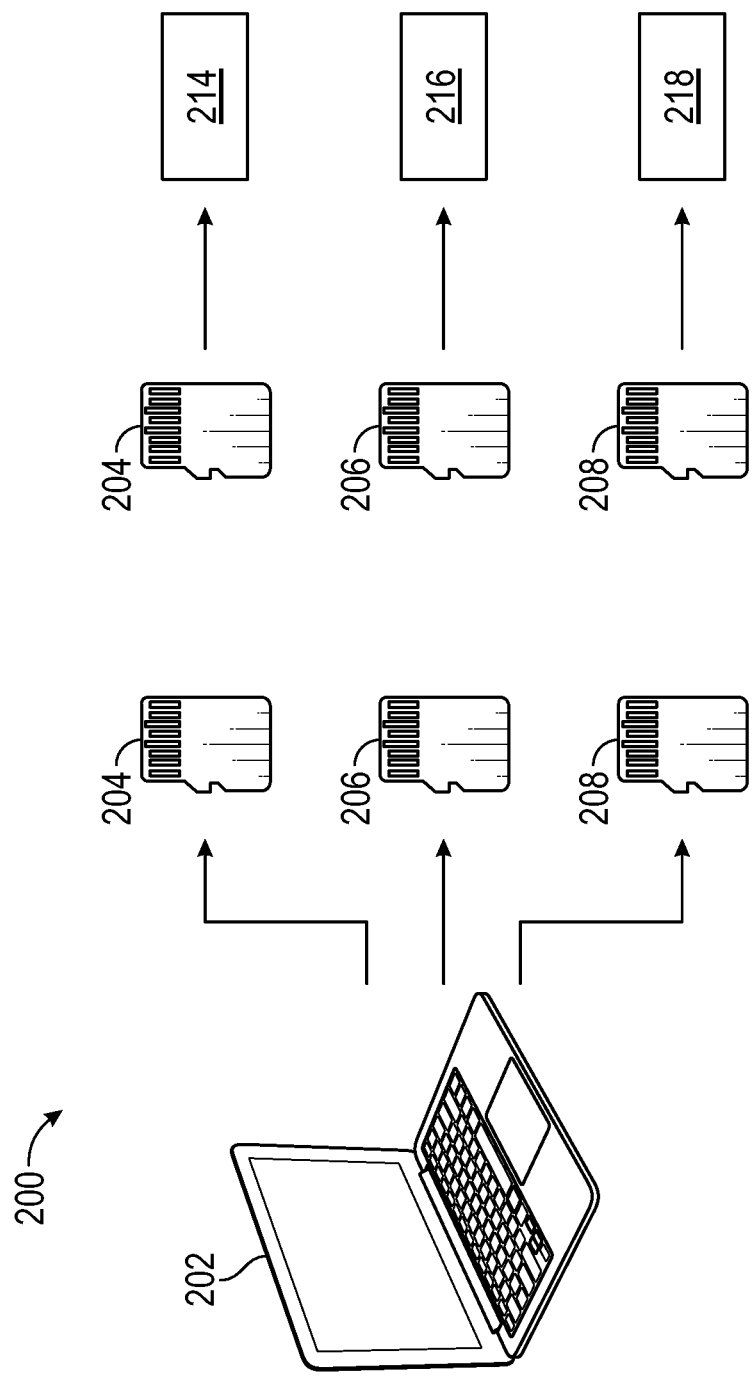
FIG. 3 is a block diagram illustrating aspects of a technique for safety device configuration cloning according to one embodiment.

With reference to FIG. 3, in one example, at step one, a computer 202 may be used to pre-program a full configuration of the one or more parameters into multiple memory cards 204, 206, 208 using a card reader/writer, e.g., a built-in card reader of the computer 202. At step two, the memory cards 204, 206, and 208 are installed into corresponding safety sensors 214, 216, and 218, respectively. Each safety sensor is configured to receive/accept its corresponding memory card, access the corresponding memory card, and utilize the information on the corresponding memory card to set/program/configure one or parameters for the safety sensor. As the sensors 214, 216, 218 are tested and debugged, steps one and two above may be repeated until the commissioning of the sensor fleet is completed.

For the technique shown in FIG. 3 to be successful, each of the sensors 214, 216, 218 must be able to accept a cloned memory card 204, 206, 208 at any point in time, both physically (the slot being accessible) and logically, i.e., the new configuration of the sensor parameters from the cloned memory card 204, 206, 208 being accepted by the software of (i) the safety sensor 214, 216, 218 or (ii) an automated device that comprises the safety sensor 214, 216, 218.

However, to maintain safety it is a goal of the present technique to prevent unauthorized changes to the configuration in a unit (e.g., a sensor or a device that includes the sensor), such as the removal or swapping of flash memory cards. In general terms, nobody without the right access level (e.g., knowledge of a password) would be able to modify the configuration in the unit.

In one embodiment, from the factory, each sensor has its own sensor serial number and a sensor password required to modify its safety configuration. A removable memory card used with such a sensor may contain or have stored thereon the following example fields: (i) a serial number of the sensor to which card belongs; (ii) a password for reconfiguration access to the sensor (e.g., an encrypted password such that the actual password cannot be learned from reading the memory card file system and then used with the regular configuration software to reconfigure the unit); (iii) a configuration parameter set for the sensor; and (iv) a cyclic redundancy check (CRC) covering fields (i)-(iii) to ensure data integrity.

The cloning process on the computer 202 may involve filling up the fields on the memory card, but leaving the serial number field blank as a "cloning" flag. The password for each unit within which each card is installed is needed to prove that correct access level is met (i.e., that the configuring/reconfiguring of unit based on a parameter set stored on the card is authorized).

Figure 4:
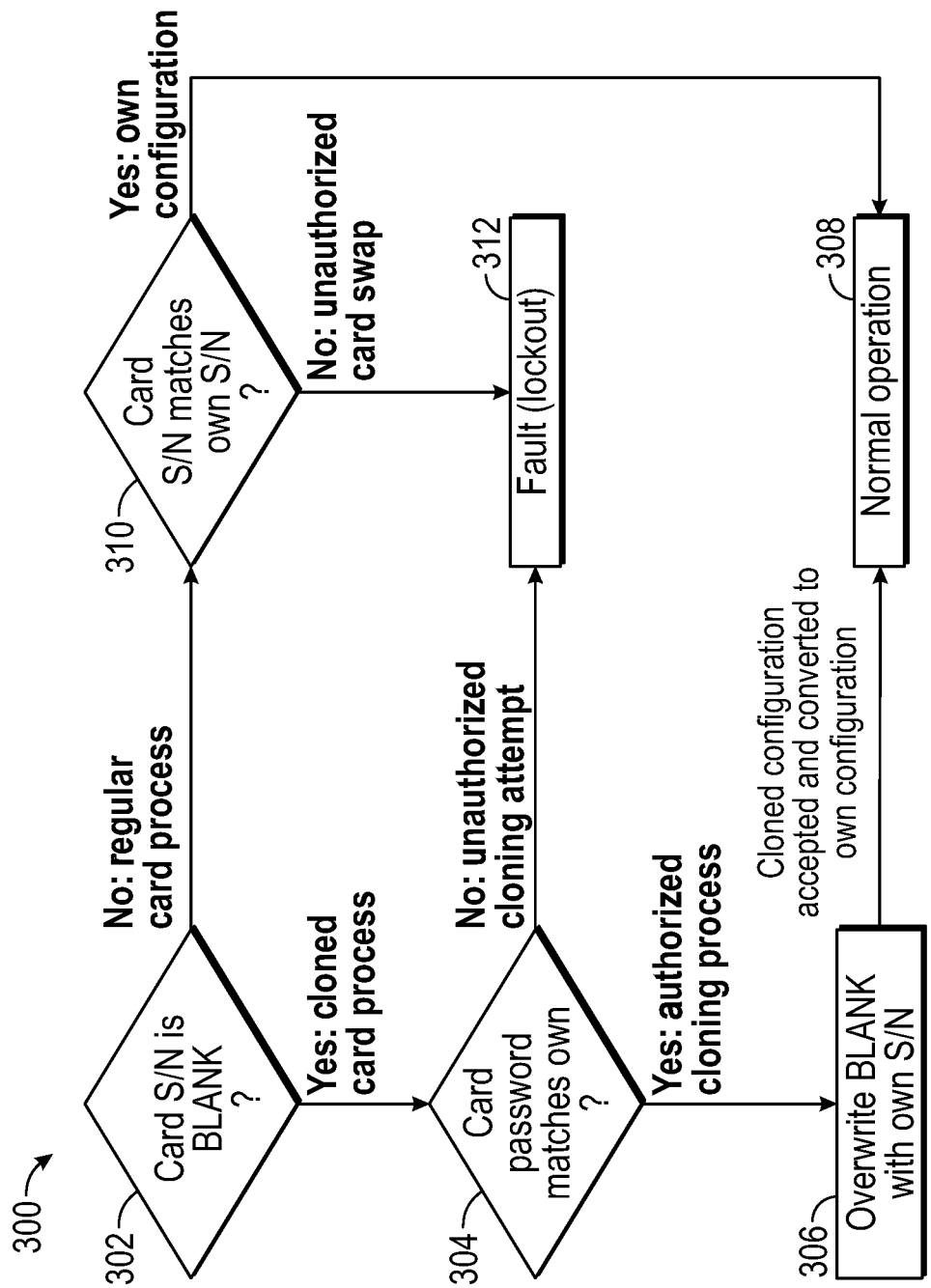
FIG. 4 is a flowchart illustrating aspects of a technique for safety device configuration cloning according to one embodiment.

FIG. 4 is a flowchart illustrating an example method 300 implemented by a processor (or controller) of a unit that comprises a safety sensor.

As illustrated, the method 300 begins at decision block 302, at which the processor determines whether a serial number field of the card is blank. If the serial number field of the card is blank, then the method 300 proceeds with a cloned card process by moving to decision block 304. If the serial number field is blank, it means the card comes from a cloning process. The password field of the card then needs to be checked against an actual unit password to ensure appropriate access level to reconfigure that unit was used during the cloning. At decision block 304, the processor determines whether a password stored on the card matches a sensor password of the sensor.

If the password stored on the card matches the unit password, then the processor determines that the cloning process is authorized, and the method 300 proceeds to block 306. At block 306, the blank serial number field is overwritten with a serial number of the sensor, and the cloned configuration of the parameters is accepted as the sensor's own configuration of the parameters. The method 300 advances from block 306 to block 308 where the sensor proceeds with normal operation, e.g., performing a safety feature based on the parameters. In other words, the sensor serial number is used to overwrite the card blank serial number, and the cloned configuration is accepted to be used in the future.

If the password stored on the card does not match the unit password, then the processor determines that the cloning attempt is unauthorized, and the method 300 proceeds to block 312 where the unit can transition into a safe lockout state.

If the serial number field of the card is not blank, then the method 300 proceeds to a regular card process by moving to decision block 310. At decision block 310, if the serial number from the card matches the sensor serial number, the card is recognized as pre-existing and its safety configuration is used. If the serial number from the card does not match the sensor serial number, then the method 300 proceeds to block 312 where the unit can transition into a safe lockout state.

Unauthorized configuration attempts where either (i) a card is from a different unit (based on the serial numbers not matching) or (ii) the passwords do not match may be detected so the unit can transition into a safe lockout state. The same is true if the CRC check over the data is not valid due to data corruption or unauthorized data manipulation.

Figure 5:
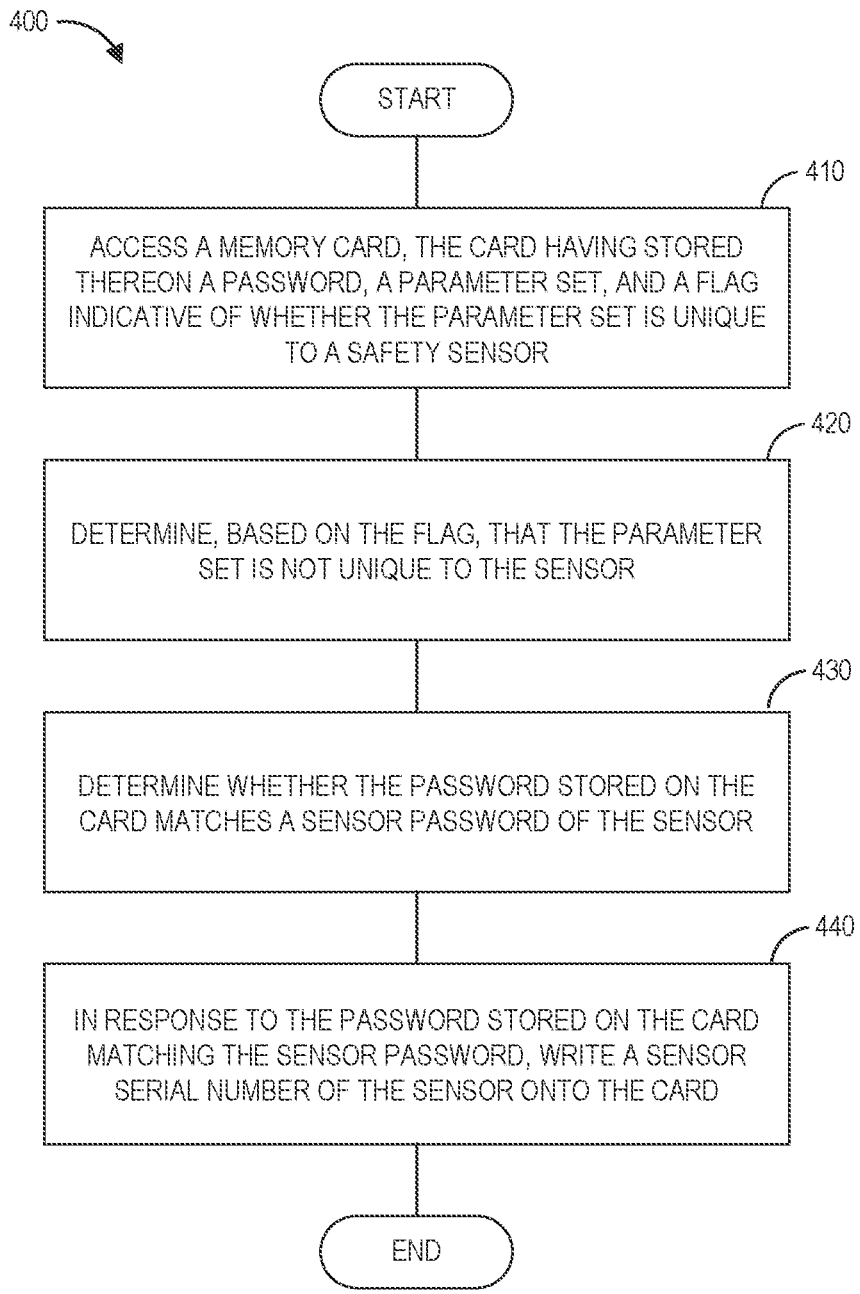
FIG. 5 is a flowchart illustrating a first example method operable by a safety sensor, the sensor configured to perform a safety feature based on one or more sensor parameters according to another embodiment.

With reference to FIG. 5, there is provided a method 400 400 by a safety unit that comprises a safety sensor, the sensor configured to perform a safety feature based on one or more sensor parameters. The method 400 may involve, at block 410, accessing a memory card, the card having stored thereon a password, a parameter set, and a flag indicative of whether the parameter set is unique to the sensor. The method 400 may involve, at block 420, determining, based on the flag, that the parameter set is not unique to the sensor. The method 400 may involve, at block 430, determining whether the password stored on the card matches a sensor password of the sensor. The method 400 may involve, at block 440, in response to the password stored on the card matching the sensor password, writing a sensor serial number of the sensor onto the card.

In one aspect, the flag may comprise a serial number field of the card. In related aspects, block 420 may involve determining that the serial number field of the card is blank. In further related aspects, the method 400 may further involve, in response to the password stored on the card matching the sensor password, writing the sensor serial number into the serial number field of the card.

In another aspect, the configuring of the sensor may comprise updating the one or more sensor parameters based on the parameter set. In yet another aspect, the configuring of the sensor may comprise copying the parameter set from the card into the memory. In still another aspect, the method 400 may further involve performing a CRC on at least one of the flag, the password, and the parameter set stored on the card to ensure data integrity.

In one aspect, the method 400 may further involve, in response to the password stored on the card matching the sensor password, deleting the password stored on the card. In another aspect, the method 400 may further involve, in response to the password stored on the card not matching the sensor password, stopping the configuration of the sensor based on the parameter set to prevent an unauthorized configuring of the sensor. In yet another aspect, the memory may be part of the sensor.

In still another aspect, the safety sensor may comprise a safety laser scanner, and the parameter set may comprise one or more of response time, operating mode, protection boundary definition, zone switching parameters, object resolution, and input and output configuration. In related aspects, the device may comprise an automated guide vehicle. In further related aspects, the device may comprise a robotic arm.

In one aspect, the safety sensor may comprise one of a safety light curtain, a single-beam safety sensor, a limit switch, a stop switch, a safety relay, and a safety network controller. In another aspect, the password may comprise an encrypted password. In yet another aspect, the parameter set may be shared among a fleet of devices, each of the devices configured to receive a corresponding card having stored thereon a corresponding password and the parameter set.

Figure 6:
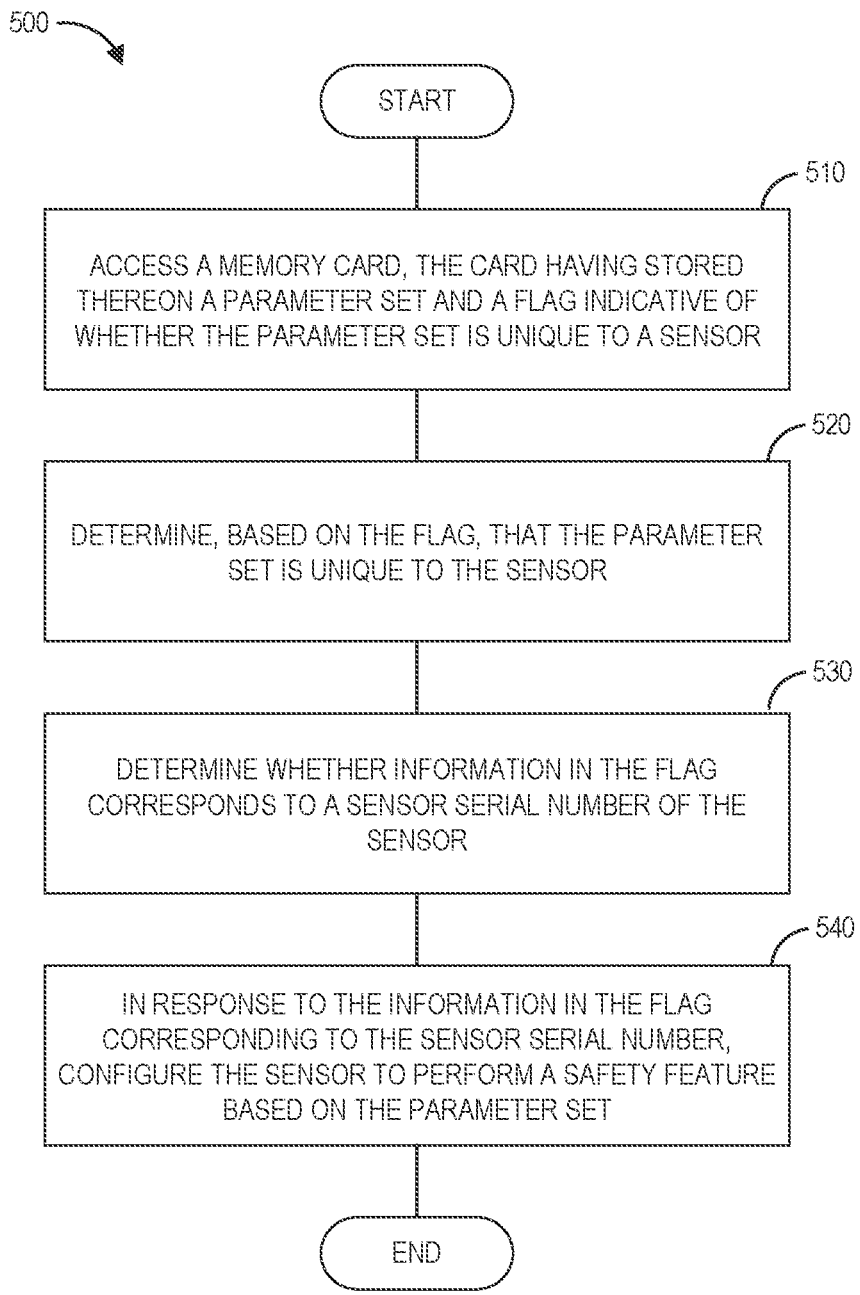
FIG. 6 is a flowchart illustrating a second example method operable by a safety sensor, the sensor configured to perform a safety feature based on one or more sensor parameters according to yet another embodiment.

With reference to FIG. 6, there is provided a method 500 operable by a safety unit that comprises a safety sensor, the sensor configured to perform a safety feature based on one or more sensor parameters. The method 500 may involve, at block 510, accessing a memory card, the card having stored thereon a parameter set and a flag indicative of whether the parameter set is unique to the sensor. The method 500 may involve, at block 520, determining, based on the flag, that the parameter set is unique to the sensor. The method 500 may involve, at block 530, determining whether information in the flag corresponds to a sensor serial number of the sensor. The method 500 may involve, at block 540, in response to the information in the flag corresponding to the sensor serial number, configuring the sensor to perform the safety feature based on the parameter set.

In one aspect, the method 500 may further involve, in response to the information in the flag not corresponding to the sensor serial number, preventing the configuration of the sensor based on the parameter set.

In another aspect, the method 500 may further involve, performing a CRC on at least one of the flag and the parameter set stored on the card.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures can be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

Directional terms used herein (e.g., top, bottom, side, up, down, inward, outward, etc.) are generally used with reference to the orientation shown in the figures and are not intended to be limiting. For example, the top surface described above can refer to a bottom surface or a side surface. Thus, features described on the top surface may be included on a bottom surface, a side surface, or any other surface.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

The above description discloses several methods and materials of the present invention(s). This invention(s) is susceptible to modifications in the methods and materials, as well as alterations in the fabrication methods and equipment. Such modifications will become apparent to those skilled in the art from a consideration of this disclosure or practice of the invention(s) disclosed herein. Consequently, it is not intended that this invention(s) be limited to the specific embodiments disclosed herein, but that it cover all modifications and alternatives coming within the true scope and spirit of the invention(s) as embodied in the attached claims.

What is claimed is:

1. A system configured to facilitate safety sensor configuration, the system comprising:
   an automated device comprising a safety sensor configured to perform a safety feature based on one or more sensor parameters, wherein a sensor serial number and a sensor password are linked with the safety sensor;
   a removable memory card configured to be accessed by the automated device and having stored thereon a parameter set, and a flag indicative of whether the parameter set is unique to the automated device;
   a processor coupled to the safety sensor; and
   a memory storing computer-executable instructions, wherein execution of the computer-executable instructions by the processor causes the processor to determine, based on the flag, whether the parameter set is unique to the automated device or not;
   when the processor determines that the parameter set is not unique to the automated device, the execution of the computer-executable instructions by the processor further causes the processor to:
      determine whether a password stored on the card matches the sensor password; and
      in response to the password stored on the card matching the sensor password, configure the safety sensor to perform the safety feature based on the parameter set from the card, and
   when the processor determines that the parameter set is unique to the automated device, the execution of the computer-executable instructions by the processor further causes the processor to:
      determine whether information in the flag corresponds to the sensor serial number; and
      in response to the information in the flag corresponding to the sensor serial number, configure the safety sensor to perform the safety feature based on the parameter set.

2. The system of claim 1, wherein the flag comprises a serial number field of the card.

3. The system of claim 2, wherein to determine that the information in the flag corresponds to the sensor serial number, the execution of the computer-executable instructions by the processor further causes the processor to determine that a serial number stored in the serial number field of the card matches the sensor serial number.

4. The system of claim 2, wherein to determine that the parameter set is not unique to the automated device, the execution of the computer-executable instructions by the processor further causes the processor to determine that the serial number field of the card is blank.

5. The system of claim 2, wherein the execution of the computer-executable instructions by the processor further causes the processor to:
   in response to the password stored on the card matching the sensor password, write the sensor serial number into the serial number field of the card.

6. The system of claim 1, wherein to configure the safety sensor, the execution of the computer-executable instructions by the processor further causes the processor to update the one or more sensor parameters based on the parameter set.

7. The system of claim 1, wherein to configure the safety sensor, the execution of the computer-executable instructions by the processor further causes the processor to copy the parameter set from the card into the memory.

8. The system of claim 1, wherein the execution of the computer-executable instructions by the processor further causes the processor to:
   perform a cyclic redundancy check (CRC) on at least one of the flag, the password, or the parameter set stored on the card to ensure data integrity.

9. The system of claim 1, wherein the execution of the computer-executable instructions by the processor further causes the processor to:
   in response to the password stored on the card matching the sensor password, delete the password stored on the card.

10. The system of claim 1, wherein the execution of the computer-executable instructions by the processor further causes the processor to:
    in response to the password stored on the card not matching the sensor password, stop configuration of the safety sensor based on the parameter set to prevent an unauthorized configuring of the safety sensor.

11. The system of claim 1, wherein the memory is part of the safety sensor.

12. The system of claim 1, wherein:
    the safety sensor comprises a safety laser scanner; and
    the parameter set comprises one or more of response time, operating mode, protection boundary definition, zone switching parameters, object resolution, or input and output configuration.

13. The system of claim 12, wherein the automated device comprises an automated guide vehicle.

14. The system of claim 12, wherein the automated device comprises a robotic arm.

15. The system of claim 1, wherein the safety sensor comprises one of a safety light curtain, a single-beam safety sensor, a limit switch, a stop switch, a safety relay, or a safety network controller.

16. The system of claim 1, wherein the password stored on the card comprises an encrypted password.

17. The system of claim 1, wherein the parameter set is shared among a fleet of devices, each device of the fleet of devices configured to receive a corresponding card having stored thereon a corresponding password and the parameter set.

18. The system of claim 1, wherein the execution of the computer-executable instructions by the processor further causes the processor to:
    in response to the information in the flag not corresponding to the sensor serial number, prevent configuration of the safety sensor based on the parameter set.

19. A method operable by a safety sensor, the safety sensor configured to perform a safety feature based on one or more sensor parameters, the method comprising:
    accessing a memory card, the card having stored thereon a parameter set, and a flag indicative of whether the parameter set is unique to the safety sensor;
    determining, based on the flag, whether the parameter set is unique to the safety sensor or not;
    when the parameter set is determined not to be unique to the safety sensor based on the flag, the method further comprising:
       determining that a password stored on the card matches a sensor password of the safety sensor; and
       in response to the password stored on the card matching the sensor password, writing a sensor serial number of the safety sensor onto the card, and when the parameter set is determined to be unique to the safety sensor based on the flag, the method further comprising:
    determining that information in the flag corresponds to a sensor serial number of the safety sensor; and
    in response to the information in the flag corresponding to the sensor serial number, configuring the safety sensor to perform the safety feature based on the parameter set.

20. The method of claim 19, wherein:
the flag comprises a serial number field; and
determining that the parameter set is not unique to the safety sensor comprises determining that the serial number field is blank.

21. The method of claim 20, wherein writing the sensor serial number onto the card comprises overwriting the serial number field with the sensor serial number.

22. The method of claim 19, further comprising:
in response to the password stored on the card matching the sensor password, configuring the safety sensor to perform the safety feature based on the parameter set.

23. The method of claim 19, further comprising:
in response to the password stored on the card matching the sensor password, deleting the password stored on the card.

24. The method of claim 19, further comprising:
in response to the password stored on the card not matching the sensor password, preventing configuration of the safety sensor based on the parameter set.

25. The method of claim 19, wherein the flag comprises a serial number field of the card.

26. The method of claim 19, wherein determining that the information in the flag corresponds to the sensor serial number comprises determining that a serial number stored in a serial number field of the card matches the sensor serial number.

27. The method of claim 19, further comprising:
in response to the information in the flag not corresponding to the sensor serial number, preventing configuration of the safety sensor based on the parameter set.

28. A non-transitory computer readable storage medium having stored thereon instructions that, when executed, cause at least one computing device to:
    access a memory card, the card having stored thereon a parameter set, and a flag indicative of whether the parameter set is unique to a safety sensor;
    determine, based on the flag, whether the parameter set is unique to the safety sensor or not;
    when the at least one computing device determines that the parameter set is not unique to the safety sensor, execution of the instructions further causes the at least one computing device to:
        determine whether a password stored on the card matches a sensor password of the safety sensor; and
        in response to the password stored on the card matching the sensor password, write a sensor serial number of the safety sensor onto the card, and
    when the at least one computing device determines that the parameter set is unique to the safety sensor, the execution of the instructions further causes the at least one computing device to:
        determine whether information in the flag corresponds to a sensor serial number of the safety sensor; and
        in response to the information in the flag corresponding to the sensor serial number, configure the safety sensor to perform a safety feature based on the parameter set.

* * * * *